Patented Dec. 26, 1950

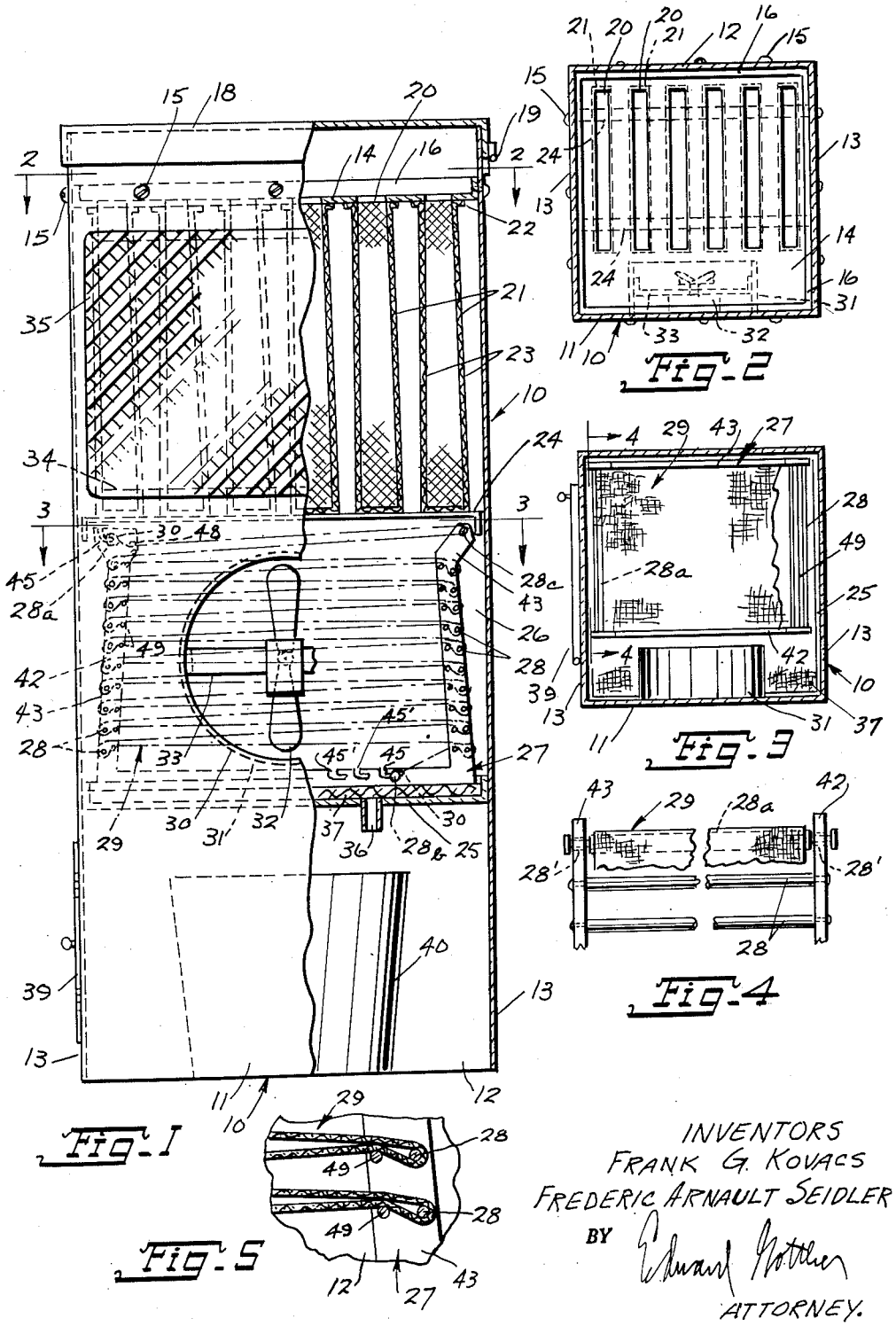

2,535,144

UNITED STATES PATENT OFFICE 2,535,144

AIR DEHUMIDIFYING APPARATUS WITH HYGROSCOPIC MATERIAL SPREADING MEANS

Frank G. Kovacs, Caldwell, and Frederic Arnault Seidler, South Orange, N. J.

Application January 22, 1949, Serial No. 72,128

4 Claims. (Cl. 183—40)

This invention relates to new and useful improvements in air dehumidifying apparatus having hygroscopic material spreading means. It may be well to point out that in a dehumidfying apparatus making use of hygroscopic material it is desirable that the hygroscopic material absorb the maximum amount of moisture that it may hold, or as close as possible to the maximum. Obviously, the more moisture absorbed the greater the efficiency of the apparatus and the economical use thereof. Yet in the dehumidifying apparatus which make use of hygroscopic material now in use, or known of, the percentage of absorption of moisture does not approach the maximum, nor even closely approximates it. In fact, they do not even reach the point where the solution of the hygroscopic material (calcium chloride) is weak enough to prevent crystallization of the waste material. When crystallization occurs in the waste container it is difficult to empty the container as well as making it difficult to discard the crystals in the plumbing discharge of a building.

The main defects inherent in present day dehumidifying apparatus using calcium chloride resides in the inefficiency of the wire screen containers in which the dry hygroscopic material is placed in order to make said hygroscopic material available to absorb atmospheric moisture. Specifically, it is customary to construct the wire screen containers so that they are V-shape, or substantially of V-shape, on the theory that this shape presents the largest area for a given volume in order to expose the greatest surface to the air. However, in practice the V-shape is highly objectionable as the converging sides of the V-form serve to support the powdered hygroscopic material, tending to cause it to cake and bridge the sides of the container. When caking occurs the containers become highly inefficient as the hygroscopic material beneath the bridges of caking becomes consumed and the bridges of caking prevent additional hygroscopic material from entering the lower portions of the containers. When there are large void spaces in the containers, obviously the efficiency of the containers to properly supply and expose the hygroscopic material is adversely affected.

An important object of this invention resides in the construction of the wire screen containers in such a manner that even if the hygroscopic material tends to cake, it cannot bridge the sides of the containers and retain elevated positions in the containers. It is proposed to so construct the side walls of the containers that the hygroscopic material must fall down to the bottom of the containers. For this reason the containers would always be fully filled with hygroscopic material when newly supplied with such material. Particularly, it is proposed to construct the side walls of each of the containers to diverge from the top down to the bottom. This new construction greatly increases the efficiency of practical operation of the containers.

Another defect inherent in present day similar apparatus resides in the operation of the usual superimposed layers of screen material placed beneath the containers for the hygroscopic material, which screens are supposed to spread out the drippings of the hygroscopic material which absorbed moisture so that additional moisture may easily be absorbed. In the past it has been customary to arrange these screens horizontally, one above the other and slightly spaced from each other. It has been customary to construct them of wire screen material. In practice the dripping hygroscopic material picks out small areas of the parallel screens and drips through these small areas instead of spreading, as contemplated. Because of this inefficiency the solution of hygroscopic material rapidly passes through the screens and reaches the collecting container at the bottom. Once it enters this container its ability to absorb moisture is negligible. Usually its concentration in this waste container is quite high and sufficient to cause crystallization. This is objectionable as already pointed out.

It is an important object of this invention to so construct the screen layers beneath the wire screen containers which initially hold the hygroscopic material, that the drippings of hygroscopic material will really be spread out, and be retained for a sufficient period of time so that a much larger degree of absorption of moisture out of the atmosphere takes place than now takes place in similar apparatus. Two important features are proposed for enhancing the efficiency of the screen layers. First, it is proposed that the layers be constructed of porous absorbent material, such as cloth, instead of wire screen material as heretofore used. Cloth material is not rapidly degenerated by a solution of calcium chloride. Because of the absorbent nature of cloth material the drippings of the hygroscopic material will readily spread out and in this way be exposed over a large surface to the air so that more efficient moisture absorption may take place. While cloth is preferred, it is not intended as a limitation as other porous material may be used as well. It is merely necessary that the porous material have the ability to permit the passage of the hygroscopic solution and simultaneously have the ability to cause the hygroscopic solution to spread throughout the areas of the screen layers before actual passage takes place. The second radical change in the construction of the screen layers, which is proposed by this invention, resides in so arranging the screens that the hygroscopic solution has a tendency of travelling, or flowing, back and forth across the succeeding layers from the top downwards until the lowermost layer is reached. This back and forth flow of the hygroscopic solution as it makes its way through the layers will expose it to greater absorption of moisture.

Another object of the invention is the construction of a device as described which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is an elevational view of a dehumidifying apparatus constructed in accordance with this invention, a front portion thereof being broken away to disclose the interior construction.

Fig. 2 is a horizontal sectional view taken on the line 2—2 of Fig. 1 but drawn on a reduced scale.

Fig. 3 is a horizontal sectional view taken on the line 3—3 of Fig. 1, but drawn on a reduced scale.

Fig. 4 is a fragmentary enlarged end view of certain interior parts of the apparatus, this view being as though taken on the line 4—4 of Fig. 3.

Fig. 5 is a fragmentary enlarged detailed view of a portion of Fig. 1.

The dehumidying apparatus, in accordance with this invention, includes a housing 10 having a vertical front wall 11, a back wall 12, and side walls 13. A top plate 14 is spaced down a short distance from the top of the housing 10 and is mounted within and across the housing. This top plate 14 is secured in position by a plurality of fastening elements, such as screws 15, which pass through the walls of the housing 10 and which engage a flange 16 formed along all of the sides of the plate 14. The housing 10 is provided with a top cover 18 which is hingedly mounted at one side by the hinge 19. The top cover 18 may be swung open and hygroscopic material placed in the space above the top plate 14 within the top portion of the housing 10. Said top plate 14 is formed with a plurality of closely spaced parallel slots 20 through which the hygroscopic material may pass downwards.

A plurality of wire screen containers 21, one for each of the slots 20, are mounted on the bottom face of the top plate 14. Each wire screen container 21 surrounds one of the slots 20. These containers 21 are formed with top flanges 22 which preferably are welded to the plate 14. Each of the containers 21 is formed with slightly inclined sides 23 diverging from the top of the container downwards in order that the container increases in horizontal cross sectional size progressively from the top downwards. The containers 21 have flat bottoms. It is this increase in size which prevents caking of the hygroscopic material, which pass through the slots 20 and fill the containers 21, from forming bridges across the side walls of the containers which would prevent subsequent complete filling of the containers. At this point it may be well to point out that were the containers 21 formed with their sides converging there would be the tendency of caking hygroscopic material to form bridges across areas of the containers which would prevent additional hygroscopic material from reaching the lower portions of the containers. Several bars 24 are mounted across the bottoms of the containers 21 in order to rigidly brace the containers 21 together.

A tray 25 is mounted within and across the housing 10 at an elevation spaced downwards from the bottom ends of the containers 21 in order to divide off an absorbing chamber 26 above the tray 25 in which the hygroscopic material will absorb moisture. A frame 27 is mounted within the absorbing chambers 26 and is provided with a plurality of horizontal parallel rods 28 along each of its sides. A flexible porous strip 29 of absorbent material, such as cloth material, is mounted in zig-zag fashion across said rods 28 forming a plurality of superimposed layers beneath the containers 21, as clearly illustrated in Figs. 1 and 5.

The front wall 11 of the housing 10 is formed with an air inlet 30 which communicates with the absorbing chamber 26, and particularly that area of the chamber 26 in which the layers of the strip 29 are located. This air inlet 30 comprises a pipe 31 connected with an opening formed in said wall 11. An air blower 32 is mounted in said pipe 31 for blowing a stream of air across said layers of the strip 29. The blower 32 is supported by a bar 33 which is mounted across the opposite inside walls of the pipe 31. Opposed walls of the housing 10, namely, the walls 11 and 12, are formed with air outlet openings 34 at locations adjacent the containers 21. These outlets 34 are covered with cross strip screens 35. A drain 36 is formed at the bottom of the tray 25. A mat of screen material 37 is rested in the bottom of the tray 25. A door 39 is arranged in the bottom portion of the wall 13 so that the door 39 may be opened to that area of the housing beneath the tray 25 in order that a pail 40 may be placed beneath the drain 36 in order to catch the solution of the hygroscopic material.

The frame 27 is provided with vertical front and back portions 42 and 43, respectively. The horizontal rods 28 are arranged in an up and down line between the side portions of said front and back portions 42 and 43, respectively. The strip of porous material 29 is mounted in zigzag fashion on the rods 28 extending from the top rod 28a to the rod 28c and then back and forth and downwards to form the superimposed layers. Said porous material 29 may be of cloth or other absorbent material in order that its pores tend to absorb and hold moisture drippings from the hygroscopic material for facilitating spreading of the hygroscopic solution and in this way facilitating further moisture absorption from the atmosphere in the chamber 26. The porous absorbent material 29 may be woven material made from other substances than cloth fibers.

Two of the rods which support the strip 29, namely, the rod indicated by reference numeral 28a at the top, and the rod indicated by the reference numeral 28b at the bottom, are removable to facilitate attaching the ends of the strip of material 29 to them. More particularly, the ends of the strip of material 29 are formed into loop portions 30 through which the rods 28a and 28b are passed. These two rods 28a and 28b are removable for the reason that they are formed with end reduced portions 28' (see Fig. 4), which engage through bayonet slots 45 formed in said vertical front and back portions 42 and 43. Adjacent the bottom bayonet slots 45 there are additional bayonet slots 45' so that the bottom rod 28b may be removed and engaged selectively as desired in these other slots. The purpose of this arrangement is to provide means for adjustably mounting at least one of these two rods 28a and 28b for facilitating stretching of the strip of material 29 in order that said layers of said strip may be stretched tight.

The rods 28 have been previously recited as being arranged in up and down lines along the side portions of the front and back portions 42 and 43 of the frame 27. More specifically, the rods 28 are disposed along downwardly and slightly outwardly inclined lines in order that said superimposed layers of the strip of material 29 may be progressively wider from the top to the bottom, except for the top layer extending between the rods 28a and 28c which is the widest. The purpose of this arrangement is to have the top layer catch all drippings from the containers 21 and then prevent drippings of the hygroscopic material from dripping over the ends of the other layers and down into the tray 25, which would be wasteful because they have not as yet had an opportunity to absorb their maximum amount of moisture. Furthermore, the rods 28 of each of said lines of rods are arranged staggered in relation to each other in order that said layers of said strip of material 29 has alternate layers sloping in one direction and the remaining layers sloping in the other direction. This may be readily seen by inspecting Fig. 1 in which the layers are schematically indicated by dot and dash lines. It is merely necessary to follow the layers and note that one layer slopes in one direction, then the next succeeding layer slopes in the other direction, etc.

A top directional rod 48 is mounted between said vertical front and back portions 42 and 43 and engages the top layer of said strip 29 for inclining sections of this top layer to the sides of this rod towards a low point adjacent the low end of the immediately adjacent lower layer. The drippings of hygroscopic solution falling from the containers 21 will first engage upon the top layer of the strip 29. Since this layer now has inclined sections because of the directional rod 48, the drippings will have a tendency to flow downwards to the lowest point of this layer. From this low point, beneath the rod 48, the drippings will fall down to the next adjacent layer. Additional directional rods 49 are mounted between said vertical front and back portions 42 and 43 and engage the end portions of the remaining layers of the strip 29 for contacting the end portions of adjacent pairs of said layers in order to cause said drippings of said hygroscopic material travelling down one layer from its high to its low point to come into direct contact with the high end of the next adjacent lower layer. This may be clearly seen by inspecting Fig. 5 which is an enlargement to illustrate this feature.

The operation of the dehumidifying apparatus may be understood from the following:

The cover 18 may be opened and the hygroscopic material, such as calcium chloride, may be placed on the top plate 14 and moved to fall through the slots 20 so as to fill the containers 21. Then the cover 18 is closed. The electric fan 32 is energized to cause a stream of air to be taken in through the inlet 30, and to be forced upwards through the housing 10 so as to pass through the absorbing chamber 26 and finally be discharged from the screened openings 35. This stream of air blows across the layers of the strip of material 29 and passes up between the containers 21. The hygroscopic material in the containers absorbs moisture and starts dripping. The drippings fall down first on to the top layer of the strip 29. This top layer absorbs the drippings so as to hold them as long as possible. As the top layer becomes saturated the drippings will make their way to its lowest point beneath the rod 48. Then they will pass through to the next adjacent layer. As they saturate this latter layer the solution will now flow down the layer to its low point and then come in communication with the top end of the adjacent layer and in this way finally make their way down to the bottom-most layer from which the solution is finally discharged into the tray 25 and drained off into the pail 40.

An important feature of the invention resides in the fact that because the side walls 23 of the containers 21 diverge from the top downwards the tendency for the side walls to support caked hygroscopic material is materially reduced. When new hygroscopic material is placed upon the plate 14 and forced to fall through the slots 20 it will fall completely to the bottom of the containers 21. This greatly adds to the efficiency of the apparatus because if the bottom portions of the containers 21 were isolated by bridging caking hygroscopic material in the top portions of the containers, the surface of possible absorption will be materially reduced.

Another important feature of the invention resides in the operation of the porous absorbent layers of the strip 29. These layers tend to spread the solution and tend to cause the solution to zig-zag back and forth so as to aid in spreading it so that the greatest amount of absorption may take place. This arrangement is far superior to parallel screens of wire or other non-absorbent material which does not tend to spread the solution and permits the solution to pass through restricted areas of the layers of screen.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new and desire to secure by United States Letters Patent is:

1. In a dehumidifying apparatus of the class described having a housing, porous containers for hygroscopic material within said housing, and a moisture absorbing chamber located beneath said porous containers, a frame within said chamber and located beneath said porous containers and having vertical front and back portions and an up and down line of horizontal rods mounted between each of the side portions of said front and back portions, and a strip of porous adsorbent material mounted in zig-zag fashion on said rods from the top rods back and forth extending downwards forming superimposed layers in order that said layers are formed from a continuous strip of material, means for circulating a current of air which is to be dehumidified through said housing and around said superimposed layers and around said porous containers, said up and down lines of rods being located along downwardly and slightly outwardly inclined lines in order that said superimposed layers are progressively wider from the top to the bottom, and the top layer of said porous material being located beneath said porous containers.

2. In a dehumidifying apparatus of the class described having a housing, porous containers for hygroscopic material within said housing, and a moisture absorbing chamber located beneath said porous containers, a frame within said chamber and located beneath said porous containers and having vertical front and back portions and an up and down line of horizontal rods mounted between each of the side portions of said front and back portions, and a strip of porous adsorbent material mounted in zig-zag fashion on said rods from the top rods back and forth extending downwards forming superimposed layers in order that said layers are formed from a continuous strip of material, means for circulating a current of air which is to be dehumidified through said housing and around said superimposed layers and around said porous containers, said up and down lines of rods being located along downwardly and slightly outwardly inclined lines in order that said superimposed layers are progressively wider from the top to the bottom, and the top layer of said porous material being located beneath said porous containers, the rods of each of said lines being staggered in relation to each other in order that said layers have alternating layers sloping in one direction and the remaining layers sloping in the other direction.

3. In a dehumidifying apparatus of the class described having a housing, porous containers for hygroscopic material within said housing, and a moisture absorbing chamber located beneath said porous containers, a frame within said chamber and located beneath said porous containers and having vertical front and back portions and an up and down line of horizontal rods mounted between each of the side portions of said front and back portions, and a strip of porous adsorbent material mounted in zig-zag fashion on said rods from the top rods back and forth extending downwards forming superimposed layers in order that said layers are formed from a continuous strip of material, means for circulating a current of air which is to be dehumidified through said housing and around said superimposed layers and around said porous containers, said up and down lines of rods being located along downwardly and slightly outwardly inclined lines in order that said superimposed layers are progressively wider from the top to the bottom, and the top layer of said porous material being located beneath said porous containers, the rods of each of said lines being staggered in relation to each other in order that said layers have alternating layers sloping in one direction and the remaining layers sloping in the other direction, and a top directional rod mounted between said vertical front and back portions and engaging the top layer of said layers for inclining sections of said top layer towards the low end of the adjacent layer.

4. In a dehumidifying apparatus of the class described having a housing, porous containers for hygroscopic material within said housing, and a moisture absorbing chamber located beneath said porous containers, a frame within said chamber and located beneath said porous containers and having vertical front and back portions and an up and down line of horizontal rods mounted between each of the side portions of said front and back portions, and a strip of porous adsorbent material mounted in zig-zag fashion on said rods from the top rods back and forth extending downward forming superimposed layers in order that said layers are formed from a continuous strip of material, means for circulating a current of air which is to be dehumidified through said housing and around said superimposed layers and around said porous containers, said up and down lines of rods being located along downwardly and slightly outwardly inclined lines in order that said superimposed layers are progressively wider from the top to the bottom, and the top layer of said porous material being located beneath said porous containers, the rods of each of said lines being staggered in relation to each other in order that said layers have alternating layers sloping in one direction and the remaining layers sloping in the other direction, and a top directional rod mounted between said vertical front and back portions and engaging the top layer of said layers for inclining sections of said top layer towards the low end of the adjacent layer, and additional direction rods mounted between said vertical front and back portions and engaging the end portions of the remaining layers for contacting the end portions of adjacent pairs of said layers in order that drippings of said hygroscopic material travelling down one layer from its high end to its low end comes into direct contact with the high end of the next adjacent lower layer.

FRANK G. KOVACS.
FREDERIC ARNAULT SEIDLER.

REFERENCES CITED

The following references are of record in the file of this patent:

UNITED STATES PATENTS

| Number | Name | Date |
| --- | --- | --- |
| 870,546 | Cooke | Nov. 12, 1907 |
| 1,170,469 | Van Calcar et al. | Feb. 1, 1916 |
| 2,076,305 | Strindberg | Apr. 6, 1937 |
| 2,274,704 | Kaufman | Mar. 3, 1942 |
| 2,366,540 | MacLean | Jan. 2, 1945 |
| 2,395,660 | Galson | Feb. 26, 1946 |